United States Patent Office 3,318,969
Patented May 9, 1967

---

3,318,969
PROCESS FOR PURIFYING A NORMAL ALPHA OLEFIN
William H. Clement, Cincinnati, Ohio, Howard M. Peters, Palo Alto, Calif., and Charles M. Selwitz, Pitcairn, Pa., assignors to Gulf Research & Development Company, Pittsburgh, Pa., a corporation of Delaware
No Drawing. Filed May 20, 1964, Ser. No. 368,985
8 Claims. (Cl. 260—683.15)

This invention relates to a process for purifying a normal alpha olefin.

Ethylene can be polymerized in the presence of a trialkyl aluminum, such as triethyl aluminum, at a temperature of about 140° to about 325° C. and a pressure of about 1000 pounds per square inch gauge to as high as about 1000 atmospheres, or even higher, for about five to about 120 minutes to obtain a mixture containing about 85 to about 95 mol percent of normal alpha olefins, about one to about 10 mol percent of internal straight chain normal olefins, about one to about 10 mol percent of trisubstituted monoolefins, that is, compounds of the structural formula $R_2C{=}CHR$, wherein R is an alkyl group, and about one to about 10 mol percent of vinylidenes, that is compounds of the structural formula $R_2C{=}CH_2$, wherein R is an alkyl group. The olefins so obtained will have predominantly from two to twenty carbon atoms, although lesser amounts of olefins having from 22 to 60 carbon atoms will also be produced.

The mixture defined above can be treated, for example, by distillation, to recover individual normal alpha olefins or fractions containing several individual normal alpha olefins. Unfortunately the other olefins defined above will remain in association with the individual normal alpha olefins or fractions containing the several individual normal alpha olefins. A particularly attractive fraction obtained from the olefin mixture defined above is one containing $C_{12}$, $C_{14}$ and $C_{16}$ normal alpha olefins which can be employed in a reaction with benzene to form a straight chain alkyl benzene which can then be sulfonated, or otherwise treated, to form a highly biodegradable detergent. In such cases in particular, and others as well, the vinylidenes and trisubstituted contaminants are not desirable, since they will react with benzene to form branch chain alkyl benzenes which when sulfonated will form detergents which are not highly biodegradable. By following the procedure defined and claimed herein the total amount of such contaminants associated with the normal alpha olefins is appreciably reduced.

We have discovered that a normal alpha olefin or mixtures of normal alpha olefins admixed with trisubstituted monoolefins and/or vinylidenes of the type defined above can be treated with anhydrous $FeCl_3$ and anhydrous HCl in order to reduce the content of said trisubstituted monoolefins and/or vinylidenes. As a result of such treatment we believe a small amount of the normal alpha olefins are isomerized to trans and/or cis internal straight chain olefins, some vinylidenes are isomerized to trisubstituted monoolefins and trisubstituted monoolefins and vinylidenes are polymerized to dimers, trimers and other low molecular weight polymers. In any event the mol percent of the desired normal alpha olefins in the final product will be increased as a result of such treatment, and while in general the mol percent of the trisubstituted monoolefins may be increased slightly, the total mol percent of the undesired trisubstituted monoolefins and vinylidenes will be substantially reduced.

The procedure of this invention resides in contacting a mixture containing at least one normal alpha olefin and at least one trisubstituted olefin and/or at least one vinylidene under selected reaction conditions with anhydrous $FeCl_3$ and anhydrous HCl. While the reaction conditions are not critical they must be closely followed in order to obtain the beneficial results of this invention. Thus, the temperature required can be from about −10° to about 75° C., preferably about 20° to about 45° C. Pressure will have little effect on the course of the reaction. In any event a pressure of about one to about 100 pounds per square inch absolute, preferably about 10 to about 30 pounds per square inch absolute, can be employed. The mixture to be treated and the anhydrous $FeCl_3$ and anhydrous HCl employed are maintained in intimate contact with each other for a period which can be, for example, from about one to about 1000 minutes, preferably from about 10 to about 200 minutes. The amount of anhydrous $FeCl_3$ employed can desirably be from about 0.1 to about 50 percent by weight, preferably from about one to about 10 percent by weight, based on the total amount of trisubstituted and/or vinylidenes present in the mixture being treated. The amount of anhydrous HCl employed can desirably be from about 0.1 to about 100 percent by weight, preferably from about one to about 25 percent by weight, based on the total amount of trisubstituted and/or vinylidenes present in the mixture being treated. Obviously, amounts in excess of the defined amounts of anhydrous $FeCl_3$ and anhydrous HCl can be employed, but would not be economical because of increased costs.

Upon completion of the reaction the treated mixture is washed with at least about 20 percent by weight thereof of water to remove the anhydrous $FeCl_3$ and anhydrous $HCl_3$ therefrom. It is fortuitous that this can be done. If anhydrous $FeCl_3$ alone were present the reaction mixture would have to be extracted with an inorganic acid, followed by washing with a basic reagent and water. Washing the reaction mixture initially with water alone if anhydrous $FeCl_3$ alone were present would not be feasible or desirable, since a gelatinous ferric hydroxide precipitate would form which would be extremely difficult to separate from the desired organic product. However, in this context wherein anhydrous $FeCl_3$ and anhydrous HCl are employed apparently a complex is formed between the two which can be easily removed from the organic product with water without forming ferric hydroxide or other undesirable precipitate. The washed organic material can then be distilled at a temperature of about 20° to about 200° C. and a pressure of about 0.001 to about 15 pounds per square inch absolute. As a result of such distillation, heavier materials, which are believed to be dimers, trimers and other low molecular weight polymers of the trisubstituted monoolefins and/or vinylidenes, remain behind and the organic material containing the normal alpha olefins, internal olefins and trisubstituted monoolefin and/or vinylidene still remaining in association with the normal alpha olefin are removed overhead as desired product.

A particularly significant feature of the present procedure resides in the fact that while anhydrous $FeCl_3$ is effective in reducing the total mol percent of vinylidenes and trisubstituted olefins and increasing the mol percent of normal alpha olefins in the treated mixture, the use of anhydrous HCl therewith reduces appreciably the amount of anhydrous $FeCl_3$ required and further reduces the amount of vinylidenes present in the treated mixture. At the same time the rate of reaction is appreciably reduced.

The invention can further be illustrated by the following. Several runs were made at atmospheric pressure wherein anhydrous $FeCl_3$, anhydrous HCl or a combination of the two were added to 50 grams of dodecene-1. The mixtures were stirred for one hour at 25° C. and then washed four times with 75 milliliter portions of water and then dried over anhydrous sodium sulfate. The organic material was then distilled at a temperature of 50° to 75° C. and 1.2 mm. of mercury. There was distilled 44.6 grams of product and there was obtained 4.6 grams of residue and 40.0 grams of overhead. The latter was analyzed by infrared. The results obtained are tabulated below in Table I.

TABLE I

| Run No. | Charge | 1 | 2 | 3 | 4 | 5 | 6 |
|---|---|---|---|---|---|---|---|
| Anhydrous FeCl$_3$, grams | | 0.84 | 0.45 | 0.20 | 0.10 | | 0.10 |
| Anhydrous HCl, grams | | | | | | 0.30 | 0.30 |
| Olefin Isomer Distribution, mol percent: | | | | | | | |
| RCH=CH$_2$ | 93.9 | 97.2 | 96.3 | 95.4 | 94.8 | 94.3 | 96.1 |
| RCH=CHR (cis and trans) | 1.7 | 1.5 | 1.5 | 1.5 | 1.5 | 1.5 | 1.5 |
| R$_2$CH=CH$_2$ | 3.7 | 0.5 | 0.7 | 1.5 | 1.1 | 3.9 | 0 |
| R$_2$C=CHR | 0.7 | 0.9 | 1.2 | 1.6 | 2.6 | 0.3 | 1.9 |

The results obtained by following the procedure of the invention defined and claimed herein are apparent from an examination of the data in Table I. In each of Runs Nos. 1, 2, 3 and 4 wherein anhydrous FeCl$_3$ alone was employed in the defined procedure the mol percent of normal alpha olefins in the product was increased and the total mol percent of vinylidenes and trisubstituted olefins was decreased. In Run No. 5 wherein anhydrous HCl alone was employed only a slight overall improvement was obtained. However, in Run No. 6 wherein anhydrous FeCl and anhydrous HCl were employed excellent results were obtained and no vinylidenes were found in the product.

Obviously, many modifications and variations of the invention, as hereinabove set forth, can be made without departing from the spirit and scope thereof, and therefore only such limitations should be imposed as are indicated in the appended claims.

We claim:
1. A process which comprises:
   contacting a first mixture containing predominantly at least one normal alpha olefin and lesser amounts of at least one substituted olefin selected from the group consisting of trisubstituted monoolefins and vinylidenes,
   with a second mixture containing about 0.1 to about 50 percent by weight of anhydrous FeCl$_3$ and about 0.1 to about 100 percent by weight of anhydrous HCl,
   under conditions to selectively polymerize said substituted olefins.
2. A process according to claim 1 wherein the amount of FeCl$_3$ is between about one and about 10 percent by weight and the amount of HCl is between about one and about 25 percent by weight.
3. A process according to claim 1 wherein the temperature during contacting is between about $-10°$ and about 75° C.
4. A process according to claim 2 wherein the temperature during contacting is between about 20° and about 45° C.
5. A process according to claim 3 and thereafter separating the resulting olefinic mixture from said anhydrous FeCl$_3$ and anhydrous HCl.
6. A process according to claim 4 and thereafter separating the resulting olefinic mixture from said anhydrous FeCl$_3$ and anhydrous HCl.
7. A process according to claim 5 wherein said first mixture contains predominantly a C$_{12}$ normal alpha olefin and lesser amounts of at least one C$_{12}$ substituted olefin selected from the group consisting of trisubstituted monoolefins and vinylidenes.
8. A process according to claim 6 wherein said first mixture contains predominantly a C$_{12}$ normal alpha olefin and lesser amounts of at least one C$_{12}$ substituted olefin selected from the group consisting of trisubstituted monoolefins and vinylidenes.

References Cited by the Examiner
UNITED STATES PATENTS 2,065,474  12/1936  Cunradi et al. ____ 260—683.15
2,159,148  5/1939  Haeuber et al. ____ 260—683.15

ALPHONSO D. SULLIVAN, *Primary Examiner.*